United States Patent
Parten et al.

(10) Patent No.: US 10,562,782 B2
(45) Date of Patent: Feb. 18, 2020

(54) METHOD FOR REMOVING NITRILES FROM HYDROGEN CYANIDE

(71) Applicant: THE CHEMOURS COMPANY FC, LLC, Wilmington, DE (US)

(72) Inventors: William David Parten, Wilmington, DE (US); Randall O. Dixon, Burlison, TN (US); Monique Bowford, Ladson, SC (US); Gary R. Maxwell, Bartlett, TN (US); Steven Lamar Grise, Landenberg, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 157 days.

(21) Appl. No.: 15/742,320

(22) PCT Filed: Jul. 12, 2016

(86) PCT No.: PCT/US2016/041836
§ 371 (c)(1),
(2) Date: Jan. 5, 2018

(87) PCT Pub. No.: WO2017/011428
PCT Pub. Date: Jan. 19, 2017

(65) Prior Publication Data
US 2018/0194640 A1    Jul. 12, 2018

Related U.S. Application Data

(60) Provisional application No. 62/192,108, filed on Jul. 14, 2015.

(51) Int. Cl.
*C01C 3/02* (2006.01)
*B01D 3/38* (2006.01)

(52) U.S. Cl.
CPC .............. *C01C 3/0295* (2013.01); *B01D 3/38* (2013.01); *C01C 3/0208* (2013.01); *C01C 3/0212* (2013.01); *C01C 3/0216* (2013.01)

(58) Field of Classification Search
CPC ... C01C 3/0208; C01C 3/0212; C01C 3/0216; C01C 3/0295; B01D 3/38
See application file for complete search history.

(56) References Cited

U.S. PATENT DOCUMENTS 1,571,982 A * 2/1926 Walker .................. C01C 3/0295
                                                            423/377
3,022,143 A * 2/1962 Yeo .......................... B01J 39/14
                                                            23/293 R (Continued)

FOREIGN PATENT DOCUMENTS

CN         103864107 A      6/2014

OTHER PUBLICATIONS

International Search Report and Written Opinion for PCT/US16/041836, dated Oct. 14, 2016.

*Primary Examiner* — Anthony J Zimmer

(57) ABSTRACT

Process for making purified hydrogen cyanide. The process includes feeding a reaction product including HCN, water, and organonitriles to a separation vessel; taking a liquid slip stream of HCN, water and organonitriles from the separation vessel; and feeding the liquid slipstream into a sidestream stripper to purge nitriles from the HCN reaction product.

10 Claims, 2 Drawing Sheets

(56) References Cited

U.S. PATENT DOCUMENTS

| | | | | |
|---|---|---|---|---|
| 3,488,919 A * | 1/1970 | Schreyer | ............... | C01C 3/0295 95/191 |
| 3,600,424 A * | 8/1971 | Laviron | ............... | C01C 3/0295 558/466 |
| 3,655,519 A * | 4/1972 | Scherhag | ............. | C01C 3/0295 203/6 |
| 3,689,215 A * | 9/1972 | Green | .................. | C01C 3/0295 423/379 |
| 4,238,295 A | 12/1980 | Odom | | |
| 4,246,417 A * | 1/1981 | Tsao | ......................... | B01D 3/38 203/10 |
| 4,530,826 A | 7/1985 | Ohashi | | |
| 6,123,852 A * | 9/2000 | Weber | .................... | C01C 3/0295 210/691 |
| 8,585,870 B2 * | 11/2013 | Basham | ................ | C07C 253/34 203/29 |
| 2004/0022709 A1* | 2/2004 | Kim | ......................... | C01C 1/12 423/236 |
| 2006/0201798 A1* | 9/2006 | Bartsch | ................ | C01C 3/0295 203/15 |
| 2009/0223804 A1* | 9/2009 | Basham | ................ | C07C 253/34 203/35 |
| 2015/0360943 A1* | 12/2015 | Caton | .................. | B01D 53/047 423/376 |
| 2016/0068404 A1* | 3/2016 | Caton | ................ | B01D 53/1418 423/372 |
| 2016/0167975 A1* | 6/2016 | Caton | ....................... | F22B 1/16 423/375 |

\* cited by examiner

METHOD FOR REMOVING NITRILES FROM HYDROGEN CYANIDE

FIELD OF THE INVENTION

The present invention relates to processes for removing nitriles from hydrogen cyanide (HCN).

BACKGROUND OF THE INVENTION

During the reaction to produce HCN a number of nitriles are formed that need to be separated from the final product. These nitriles are ultimately sent to a thermal converter for destruction but also carry valuable HCN with them which represents a product loss. Three issues exist with state of the art methods for producing HCN which are: 1) the loss of HCN with the nitriles that are purged; 2) the additional NOX generation caused by conversion of HCN and nitriles in the thermal converter; and 3) The build-up of nitriles in the HCN refining train which lead to foaming because of their tendency to form two liquid phases with subsequent variation in performance of the refining train leading to production interruption and occasional loss of product purity.

A well-known process for producing HCN is the so called Andrussow process. The Andrussow process is used for gas phase production of HCN from methane, ammonia, and oxygen over a platinum catalyst. Filtered ammonia, natural gas and oxygen are fed into a reactor and heated in the presence of a platinum catalyst to temperatures in the range of 800-1500° C. Typically, the methane is supplied from natural gas, which can be further purified; $C_2$, $C_3$, and higher hydrocarbons (e.g., ethane, ethene, propane, propene, butane, butene, isobutane, etc., collectively termed $C_{2+}$ hydrocarbons) can be present in natural gas. While air can be used as a source of oxygen, the reaction can also be carried out using undiluted oxygen or oxygen-enriched air (i.e., an oxygen Andrussow process).

In the Andrussow process, the primary reactor output includes hydrogen cyanide, unreacted ammonia, carbon dioxide, and reaction impurities including organonitriles (such as acetonitrile, acrylonitrile, and propionitrile). Typically, the reactor off-gas product stream containing HCN and un-reacted ammonia is quenched in a waste heat boiler to temperatures in the range of about 100-400° C. at the outlet. The cooled reactor off-gas is sent through an ammonia removal process wherein the ammonia is contacted with an acid in water to form the non-volatile ammonium salt of the acid. This is accomplished by contacting the cooled off-gas with an ammonium phosphate solution, phosphoric acid or sulfuric acid to remove the ammonia. From the ammonia absorber the product off-gas is sent through the HCN absorber where cold water is added to entrain the HCN. The HCN-water mixture is then sent to separation and purification equipment to produce an HCN product stream that is as pure as possible and a water stream that is as pure as possible. The substantially pure hydrogen cyanide can be stored in tanks or directly used as a feedstock. The water stream can either be recycled or disposed of.

Among contaminants observed in the Andrussow process are organonitrile compounds, mainly acetonitrile, acrylonitrile, and propionitrile (as mentioned above), which can end up in the separation and purification equipment. When this occurs, the columns must periodically be purged, otherwise column performance deteriorates and the possibility for production of poor quality product or process upsets increases. Normally a continuous purge is needed to avoid process upsets, but this purging results in a loss of up to 2% of HCN production. When acrylonitrile or other organonitriles are among the impurities, their concentration in the aqueous fractionator bottoms can increase to levels wherein phase separation from the aqueous medium can start to occur. Particularly when high concentrations of acrylonitrile are present as phase-separated enrichment, production of poor quality product or process upsets can and does occur more readily.

Thus, a need exists for a method for making HCN with substantially reduced organonitrile concentrations to alleviate the above described problems with current, state of the art HCN production. Moreover, a need exists for a method for making HCN, wherein HCN is not lost through the current process of continuously purging separation and purification equipment.

SUMMARY OF THE INVENTION

By practicing the present invention, buildup of organonitriles in process equipment can be markedly reduced. Moreover, substantially pure HCN can be produced. Furthermore, loss of HCN through purging of separation and purification equipment can be eliminated.

The invention comprises a method for making purified HCN comprising the steps of: feeding a reaction product comprising water, HCN, and organonitriles to a separation vessel; taking a liquid slipstream of the reaction product from the separation vessel and feeding the liquid slipstream into a sidestream stripper; providing sufficient heat to the sidestream stripper to effect the separation of the HCN from the organonitriles and water; purging the organonitriles from the sidestream stripper; returning the HCN to at least one of the separation vessel and purification equipment; and recovering the purified HCN.

An aspect of the invention comprises the steps of reacting methane, a source of oxygen, ammonia, and a catalyst in a reactor under conditions to produce a reaction product comprising HCN, water and organonitriles; feeding the reaction product into a separation vessel; taking a liquid slip stream comprising HCN, water and organonitriles from the separation vessel; feeding the liquid slip stream into a sidestream stripper; providing heat to the sidestream stripper; purging the organonitriles from the sidestream stripper; returning the HCN to the separation vessel or purification equipment; and recovering the HCN.

DETAILED DESCRIPTION OF THE INVENTION

Figure 1:
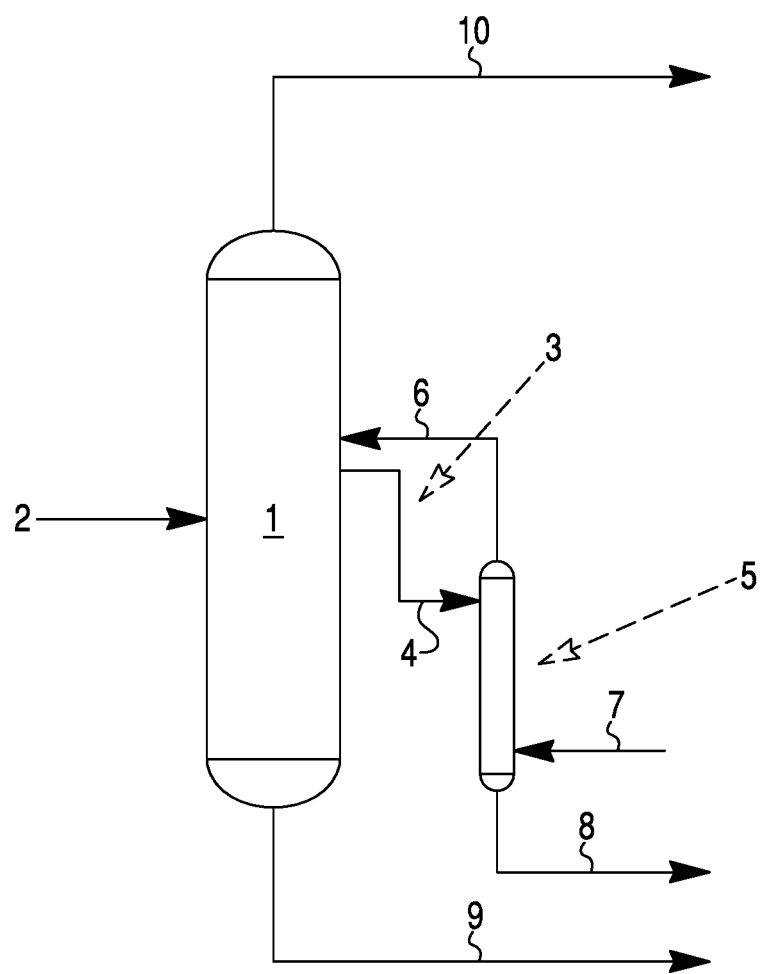
FIG. 1 is a schematic diagram of the hydrogen cyanide refining process according to the invention.

The following definitions and abbreviations are to be used for the interpretation of the claims and the specification.

As used herein, the terms "comprises," "comprising," "includes," "including," "has," "having," "contains" or "containing," or any other variation thereof, will be understood to imply the inclusion of a stated integer or group of integers but not the exclusion of any other integer or group of integers. For example, a composition, a mixture, a process, a method, an article, or an apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive "or" and not to an exclusive. For example, a condition A or B is satisfied by any one of the following: A is true (or present) and B is false (or not present), A is false (or not present) and B is true (or present), and both A and B are true (or present).

As used herein, the term "consists of," or variations such as "consist of" or "consisting of," as used throughout the specification and claims, indicate the inclusion of any recited integer or group of integers, but that no additional integer or group of integers may be added to the specified method, structure, or composition.

As used herein, the term "consists essentially of," or variations such as "consist essentially of" or "consisting essentially of," as used throughout the specification and claims, indicate the inclusion of any recited integer or group of integers, and the optional inclusion of any recited integer or group of integers that do not materially change the basic or novel properties of the specified method, structure or composition.

Also, the indefinite articles "a" and "an" preceding an element or component of the invention are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

As used herein, the term "about" modifying the quantity of an ingredient or reactant of the invention employed refers to variation in the numerical quantity that can occur, for example, through typical measuring and liquid handling procedures used for making concentrates or solutions in the real world; through inadvertent error in these procedures; through differences in the manufacture, source, or purity of the ingredients employed to make the compositions or to carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value, preferably within 5% of the reported numerical value.

The invention comprises a method for making purified HCN comprising the steps of: feeding a reaction product comprising water, HCN, and organonitriles to a separation vessel; taking a liquid slipstream of the reaction product from the separation vessel and feeding the liquid slipstream into a sidestream stripper; providing sufficient heat to the sidestream stripper to effect the separation of the HCN from the organonitriles and water; purging the organonitriles from the sidestream stripper; returning the HCN to at least one of the separation vessel and purification equipment; and recovering the purified HCN.

An aspect of the invention comprises the steps of reacting methane, a source of oxygen, ammonia, and a catalyst in a reactor under conditions to produce a reaction product comprising HCN, water and organonitriles; feeding the reaction product into a separation vessel; taking a liquid slip stream comprising HCN, water and organonitriles from the separation vessel; feeding the liquid slip stream into a sidestream stripper; providing heat to the sidestream stripper; purging the organonitriles from the sidestream stripper; returning the HCN to the separation vessel or purification equipment; and recovering the HCN.

An aspect of the invention comprises the steps of reacting propylene, a source of oxygen, ammonia, and a catalyst in a reactor under conditions to produce a reaction product comprising HCN, water and organonitriles; feeding the reaction product into a separation vessel; taking a liquid slip stream comprising HCN, water and organonitriles from the separation vessel; feeding the liquid slip stream into a sidestream stripper; providing heat to the sidestream stripper; purging the organonitriles from the sidestream stripper; returning the HCN to the separation vessel or purification equipment; and recovering the HCN.

An aspect of the invention comprises the steps of reacting propane, a source of oxygen, ammonia, and a catalyst in a reactor under conditions to produce a reaction product comprising HCN, water and organonitriles; feeding the reaction product into a separation vessel; taking a liquid slip stream comprising HCN, water and organonitriles from the separation vessel; feeding the liquid slip stream into a sidestream stripper; providing heat to the sidestream stripper; purging the organonitriles from the sidestream stripper; returning the HCN to the separation vessel or purification equipment; and recovering the HCN.

In an aspect of the invention sulfur dioxide can be added to the separation vessel or any associated streams to minimize the formation of undesirable polymer products.

In an aspect of the invention at least one of sulfuric acid, phosphoric acid, acetic acid, and glycolic acid can be added to the separation vessel or any associated streams to minimize the formation of undesirable polymer products.

In an aspect of the invention practicing the method of the present invention can increase production of HCN by 2%.

With reference to FIG. 1 a specific, exemplary embodiment of the invention will be described. In FIG. 1, a reaction product 2 comprising HCN, water, and organonitriles is fed into separation vessel 1. A liquid slip stream 3 is taken from the separation vessel 1 and fed 4 into sidestream stripper 5, which can comprise a packed bed or trayed column (not shown), with steam 7 introduced at the bottom of sidestream stripper 5 to heat the sidestream stripper 5. Upon heating the sidestream stripper 5, organonitriles are purged 8 from the sidestream stripper 5, while HCN is returned 6 to the separation vessel 1. Substantially pure HCN is produced 10. Water 9 can either be recycled or disposed.

Although the invention has been described with specific reference to HCN produced by the Andrussow process, the invention can also be used in the acrylonitrile process or any process where it is desired to remove contaminants such as organonitriles from reaction products.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

ASPEN Model: Flowsheet

Processes described herein were demonstrated using a computational model of a process based on the diagram of FIG. 1. Process modeling is an established methodology used by engineers to simulate complex chemical processes. The commercial modeling software Aspen Plus® (Aspen Technology, Inc., Burlington, Mass.) was used in conjunction with physical property databases, such as DIPPR, available from the American Institute of Chemical Engineers, Inc. (New York, N.Y.) and OLI to develop an ASPEN model of the above described process.

Example 1—Sidestream Stripper Feed Rate=500 Pounds Per Hour

With a feed rate of 500 pounds per hour, the composition of the feed stream (3) to the Sidestream Stripper Column would have the following concentrations on a mass % basis:

| Component | Mass % |
| --- | --- |
| HCN | 51.792% |
| Acrylonitrile | 1.156% |
| Acetonitrile | 9.826% |
| Propionitrile | 0.269% |
| $H_2O$ | 36.957% |

The total nitriles in the side stream purge would be 11.25%.

The composition of the HCN stream (6) that leaves the Sidestream Stripper and is returned to the HCN purification equipment would be:

| Component | Mass % |
| --- | --- |
| HCN | 91.081% |
| ACRN | 0.831% |
| ACEN | 2.610% |
| PROPN | 0.071% |
| H2O | 5.406% |

The composition of the Nitriles Purge stream (8) would be:

| Component | Mass % |
| --- | --- |
| HCN | 0.001% |
| ACRN | 1.584% |
| ACEN | 19.338% |
| PROPN | 0.531% |
| H2O | 78.546% |

Example 2—Aspen Model—Sidestream Stripper Feed Rate=1,000 Pounds Per Hour

With a feed rate of 1,000 pounds per hour, the composition of the feed stream (3) to the Sidestream Stripper Column would have the following concentrations on a mass % basis:

| Component | Mass % |
| --- | --- |
| HCN | 46.340% |
| Acrylonitrile | 0.997% |
| Acetonitrile | 5.032% |
| Propionitrile | 0.140% |
| $H_2O$ | 47.490% |

The total nitriles in the side stream purge would be 6.17%.

The composition of the HCN stream (6) that leaves the Sidestream Stripper and is returned to the HCN purification equipment would be:

| Component | Mass % |
| --- | --- |
| HCN | 91.361% |
| ACRN | 1.293% |
| ACEN | 1.662% |
| PROPN | 0.049% |
| H2O | 5.635% |

The composition of the Nitriles Purge stream (8) is:

| Component | Mass % |
| --- | --- |
| HCN | 0.001% |
| ACRN | 0.693% |
| ACEN | 8.501% |
| PROPN | 0.233% |
| H2O | 90.571% |

Example 3—Aspen Model—Sidestream Stripper Feed Rate=1,500 Pounds Per Hour

With a feed rate of 1,500 pounds per hour, the composition of the feed stream (3) to the Sidestream Stripper Column would have the following concentrations on a mass % basis:

| Component | Mass % |
| --- | --- |
| HCN | 44.071% |
| Acrylonitrile | 1.042% |
| Acetonitrile | 3.401% |
| Propionitrile | 0.095% |
| $H_2O$ | 51.391% |

The total nitriles in the side stream purge would be 4.54%.

The composition of the HCN stream (6) that leaves the Sidestream Stripper and is returned to the HCN purification equipment would be:

| Component | Mass % |
| --- | --- |
| HCN | 91.327% |
| ACRN | 1.687% |
| ACEN | 1.237% |
| PROPN | 0.038% |
| H2O | 5.712% |

The composition of the Nitriles Purge stream (8) would be:

| Component | Mass % |
|---|---|
| HCN | 0.001% |
| ACRN | 0.440% |
| ACEN | 5.420% |
| PROPN | 0.149% |
| H2O | 93.991% |

Example 4—Aspen Model Summary

Figure 2:
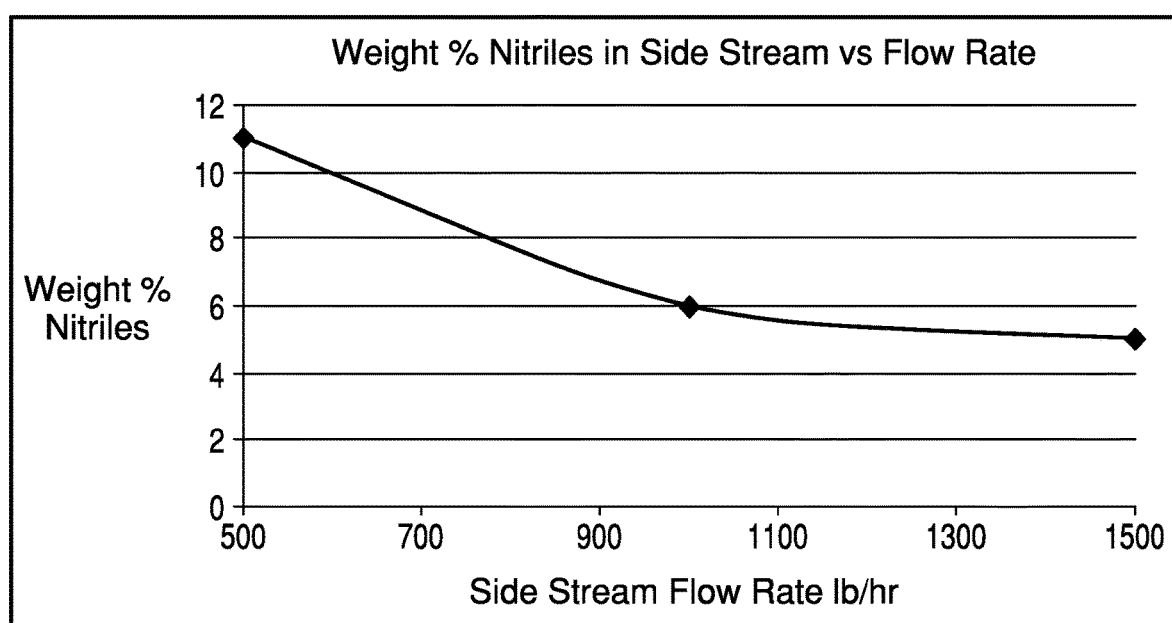
FIG. 2 is a graph showing the relationship between feed rate to a sidestream stripper and the nitriles concentration in the feed stream to the sidestream stripper according to Example 4.

FIG. 2 shows the relationship between feed rate to Sidestream Stripper and the nitriles concentration in the Feed stream to the Sidestream Stripper. This shows that higher feed rates lead to lower nitriles in the process—which leads to a higher quality HCN product.

What is claimed is:

1. A method for making purified HCN comprising the steps of:
feeding a reaction product comprising water, HCN, and organonitriles to a separation vessel; taking a liquid slipstream of the reaction product from the separation vessel and feeding the liquid slipstream into a sidestream stripper; providing sufficient heat to the sidestream stripper to effect the separation of the HCN from the organonitriles and water; purging the organonitriles from the sidestream stripper; returning the HCN to at least one of the separation vessel and purification equipment; and recovering the purified HCN.

2. The method of claim 1, wherein the sidestream stripper comprises a packed bed.

3. The method of claim 1, wherein the sidestream stripper comprises trays.

4. The method of claim 1, wherein the heat is supplied via direct injection of steam into the sidestream stripper.

5. The method of claim 1, wherein the heat is supplied via indirect heating with steam.

6. The method of claim 1, wherein the reaction product is produced by reacting methane, a source of oxygen, and ammonia.

7. The method of claim 1, wherein the reaction product is produced by reacting propylene, a source of oxygen, and ammonia.

8. The method of claim 1, wherein the reaction product is produced by reacting propane, a source of oxygen, and ammonia.

9. The method of claim 1, wherein sulfur dioxide is added to the separation vessel to minimize the formation of undesirable polymer products.

10. The method of claim 1, wherein at least one of sulfuric acid, phosphoric acid, acetic acid, and glycolic acid is added to the separation vessel to minimize the formation of undesirable polymer products.

\* \* \* \* \*